United States Patent [19]

Mehring et al.

[11] Patent Number: 5,265,236
[45] Date of Patent: Nov. 23, 1993

[54] METHOD AND APPARATUS FOR INCREASING THE SPEED OF MEMORY ACCESS IN A VIRTUAL MEMORY SYSTEM HAVING FAST PAGE MODE

[75] Inventors: Peter A. Mehring, Wilmington; Robert Becker, Shirley; Varoujan Garapetian, Cambridge, all of Mass.

[73] Assignee: Sun Microsystems, Inc., Mountain View, Calif.

[21] Appl. No.: 47,876

[22] Filed: Apr. 12, 1993

Related U.S. Application Data

[63] Continuation of Ser. No. 619,873, Nov. 29, 1990, abandoned.

[51] Int. Cl.$^5$ .............................................. G06F 12/10
[52] U.S. Cl. ........................ 395/425; 364/DIG. 1; 364/243.4; 364/254.3
[58] Field of Search .............................. 395/425, 400; 364/200 MS File, 900 MS File

[56] References Cited

U.S. PATENT DOCUMENTS

| | | |
|---|---|---|
| 4,839,856 | 6/1989 | Tanaka ............................ 395/425 |
| 4,847,758 | 7/1989 | Olson et al. ..................... 395/425 |
| 4,872,138 | 10/1989 | Ciacci ............................ 365/49 |
| 4,924,375 | 5/1990 | Fung et al. ..................... 395/425 |
| 4,933,910 | 6/1990 | Olson et al. .................... 365/238.5 |
| 5,034,917 | 7/1991 | Bland et al. .................... 395/425 |
| 5,051,889 | 9/1991 | Fung et al. ..................... 395/425 |

Primary Examiner—Joseph L. Dixon
Assistant Examiner—Hiep T. Nguyen
Attorney, Agent, or Firm—Blakely Sokoloff Taylor & Zafman

[57] ABSTRACT

In the memory access unit of the present invention, the memory request logic is centralized in the memory management unit (MMU). The MMU instructs the MCU, which interfaces directly with the DRAMs, on the type of memory access to perform. By centralizing the memory requests, the MMU is able to maintain an account of each memory access, thereby providing the MMU the means to determine if a memory access fulfills the requirements of a fast page mode access before a request is made to the MCU. The MMU comprises the row address comparator which can execute the row address comparison in parallel with the cache lookup. Therefore, if the cache lookup determines a memory access is required, a specific fast page mode memory access request can be made, without the memory controller incurring the additional delay of checking the row address. Thus, by using the memory access unit of the present invention, the system can default to fast page mode access without the additional penalty normally incurred by comparing the row address in a serial manner.

7 Claims, 6 Drawing Sheets

METHOD AND APPARATUS FOR INCREASING THE SPEED OF MEMORY ACCESS IN A VIRTUAL MEMORY SYSTEM HAVING FAST PAGE MODE

This is a continuation of application Ser. No. 07/619,873, filed Nov. 29, 1990, abandoned.

BACKGROUND OF THE INVENTION

1. Field of the Invention:

The present invention relates to the field of memory apparatus in digital systems. Specifically the present invention relates to the time saving technique of detecting both cache mode and fast page mode in the same clock cycle.

2. Art Background:

In traditional systems design, memory latency—the delay incurred when retrieving data from main memory, is a limiting factor in increasing performance. Cache memories are used to somewhat minimize the time penalties due to accesses to main memory. Cache memories are relatively small, high speed buffer memories used in computer systems to temporarily hold those portions of the contents of memory which are currently in use. Information located in the cache memory may be accessed in less time than information located in main memory. The advantages of cache memories are derived from the property of locality with respect to memory accesses in a computer system. Two types of locality exist, temporal and spatial. Temporal locality reflects the observation that information which will be in use in the near future is likely to be in use already. Spatial locality reflects the observation that address space of information to be accessed is likely to be near the address space of currently accessed information. For further information on cache memories, see Smith, "Cache Memories", *Computing Surveys*, Vol 14, No. 3, pp 474–530 (September 1982) and Hennessy & Patterson, *Computer Architecture A Quantitative Approach*, 403–425 (Morgan Kaufman 1990).

System designers have further improved memory latency by taking advantage of DRAM (Dynamic Random Access Memory) technology, specifically fast page mode DRAMs. These DRAMs are used as the main memory and allow for faster access to a memory location provided it is accessing the same row address as the previous memory access. DRAM access times are divided into random access times and column (or fast page mode) access times. Fast page mode DRAMs allow repeated access to the same row, with the benefit of not incurring the RAS precharge and RAS setup delays. Fast page mode DRAMs take advantage of the program behavior known as spatial locality, which describes the tendency of program data to access a narrow region of memory over a given amount of time. (See Hennessy & Patterson, *Computer Architecture A Quantitative Approach*, pages 431–432 (Morgan Kaufman 1990)). To support fast page mode DRAM accesses, designers have to insure that subsequent memory accesses are to the same row address as the initial memory access. If a subsequent memory access requires a different row to be accessed, an additional delay is incurred while a random memory access is initiated to service the different row address (the additional time being used to precharge the Row Address Strobe (RAS) and for the address setup time between the RAS and Column Address Strobe (CAS)). However, system designers of general purpose processors can not rely on any predictable order of memory access, and therefore must implement a row address comparator, in which each memory access row address is compared to the previous memory access row address. The comparator is located in the memory control unit (MCU). The MCU drives the DRAM control signal lines and determines if the current memory access may take advantage of a fast page mode access, or incur the additional delay of a random access. The fast page mode access capability improves performance by taking advantage of spatial locality; however, a price is paid in terms of the delay incurred by the row address comparator. In a synchronous system, this may add an additional cycle to all memory accesses. Early memory designs tended to accelerate only overlapping memory accesses, and defaulted to a random access mode (in which all DRAM control signals return to inactive) as the default, or idle, state.

Recent high performance memory control designs have improved upon previous designs by implementing the fast page mode access as the default access type. This requires that the row address for each memory access be checked before the access begins, to determine if the correct row is being accessed. The memory controller determines which type of memory access is appropriate before initiating the memory access. In a synchronous design, the comparison requires an additional clock cycle for all memory accesses. However, because fast page mode access is normally two or three times faster than random access mode, a single state or cycle penalty on all memory accesses still increases overall performance over a system that does not implement fast page mode access.

In a memory system containing a cache memory for a memory access, the memory management unit (MMU) first determines if the data being accessed is resident in the cache. If the data is found in the cache, the memory access is satisfied without accessing main memory. If the data is not resident in the cache, the MMU notifies the MCU that access to main memory is required. In a synchronous system, the cache lookup requires one or more states or clock cycles to determine if a main memory access is required. Additionally, if more than one processor is present, or if an I/O subsystem that supports direct memory access (DMA) is present, arbitration for memory access must also take place.

An illustrative computer system is shown in FIG. 1. Shown there is a computer 101 which comprises three major components. The first of these is the input/output (I/O) circuit 102 which is used to communicate information in appropriately structured form to and from the other parts of the computer 101. Also shown as a part of computer 101 is the central processing unit (CPU) 103 and memory subsystem 104. Also shown in FIG. 1 is an input device 105, shown in typical embodiment as a keyboard. It should be understood, however, that the input device may actually be a card reader, magnetic or paper tape reader, or other well-known input device (including, of course, another computer). In addition, a display monitor 107 is illustrated which is used to display messages or other communications to the user. A cursor control 109 is used to select command modes and edit the input data, and in general provides a more convenient means to input information into the system.

The memory subsystem 104 comprises a memory management unit (MMU) 112, a memory control unit (MCU) 114, a cache 116, main memory 118, and an input/output interface 110 which connects to the mass memory 106. Mass memory 106 is connected to the computer 101 as a peripheral device and may be a disk drive, tape drive or the like. In the present illustration, the main memory 118 is a DRAM which provides for fast page mode access.

MMU 112 receives a data request from the CPU, performs any address translation from virtual to physical that is needed, and determines whether the data is located in mass memory 106, in main memory 118 or in the cache 116. If the data is located in the cache 116, a signal is sent to retrieve the data from the cache 116 and return the data to the MMU for transmission to the CPU 103. If the data is not located in the cache 116, a signal is sent to the MCU 114 to retrieve the requested data from main memory 118. The MCU 114 drives the signal lines (i.e., row, column lines) to access the memory location containing the requested data. If the main memory 118 consists of fast page mode DRAMs, the MCU 114, prior to driving the signal lines, will compare the row address of the data to be accessed with the row address previously accessed. If the row addresses are the same, a quick access of the data can be achieved by executing a fast page mode cycle in which only the column address and CAS are required to access the correct location. If the row addresses are not the same, the MCU 114 must execute a random access cycle and incur the additional delay.

The process flow for accessing data in a cached memory system is illustrated by the flow diagram of FIG. 2 and the signal timing is illustrated by the timing diagram of FIG. 3. A processor memory request 210 is initiated by the processor (i.e., CPU). This request is directed to the Memory Management Unit (MMU) which performs a cache lookup 220 to determine if the data requested is currently located in the cache. If the data is located in the cache, a "hit" occurs and the data is quickly transferred to the processor. If the data is not located in the cache, a "miss" occurs and the process continues by initiating a main memory access request 230 and performing any necessary arbitration (which is needed if the input/output subsystem has the ability to do direct memory access, if the system is a multiple processor system or if the CPU design incorporates separate instruction and data caches, where each cache can independently request a memory access). The main memory access request is directed to the memory control unit (MCU) which performs a row address comparison 240 to determine whether data is located at the same row address as the previous data accessed. If the data is located at the same row address, a hit occurs and the fast page mode access 250 is employed. If a miss occurs a slower random access of memory 260 is performed to access the data requested.

SUMMARY OF THE INVENTION

It is therefore an object of the present invention to provide a faster method for fast page mode accessing in a cached memory system.

It is an object of the present invention to decrease the number of penalty clock cycles required in order to perform an access to main memory.

In the memory access unit of the present invention, the memory request logic is centralized in the memory management unit (MMU). The MMU instructs the MCU, which interfaces directly with the DRAMs, on the type of memory access to perform. By centralizing the memory requests, the MMU is able to maintain an account of each memory access, thereby providing the MMU the means to determine if a memory access fulfills the requirements of a fast page mode access before a request is made to the MCU. The MMU comprises the row address comparator which can execute the row address comparison in parallel with the cache lookup. Therefore, if the cache lookup determines a main memory access is required, a specific fast page mode memory access request can be made, without the memory controller incurring the additional delay of checking the row address. Thus, by using the memory access unit of the present invention, the system can default to fast page mode access without the additional penalty normally incurred by comparing the row address in a serial manner.

BRIEF DESCRIPTION OF THE DRAWINGS

The objects, features and advantages of the present invention will be apparent from the following detailed description in which.

NOTATION AND NOMENCLATURE

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE PRESENT INVENTION

Figure 4:
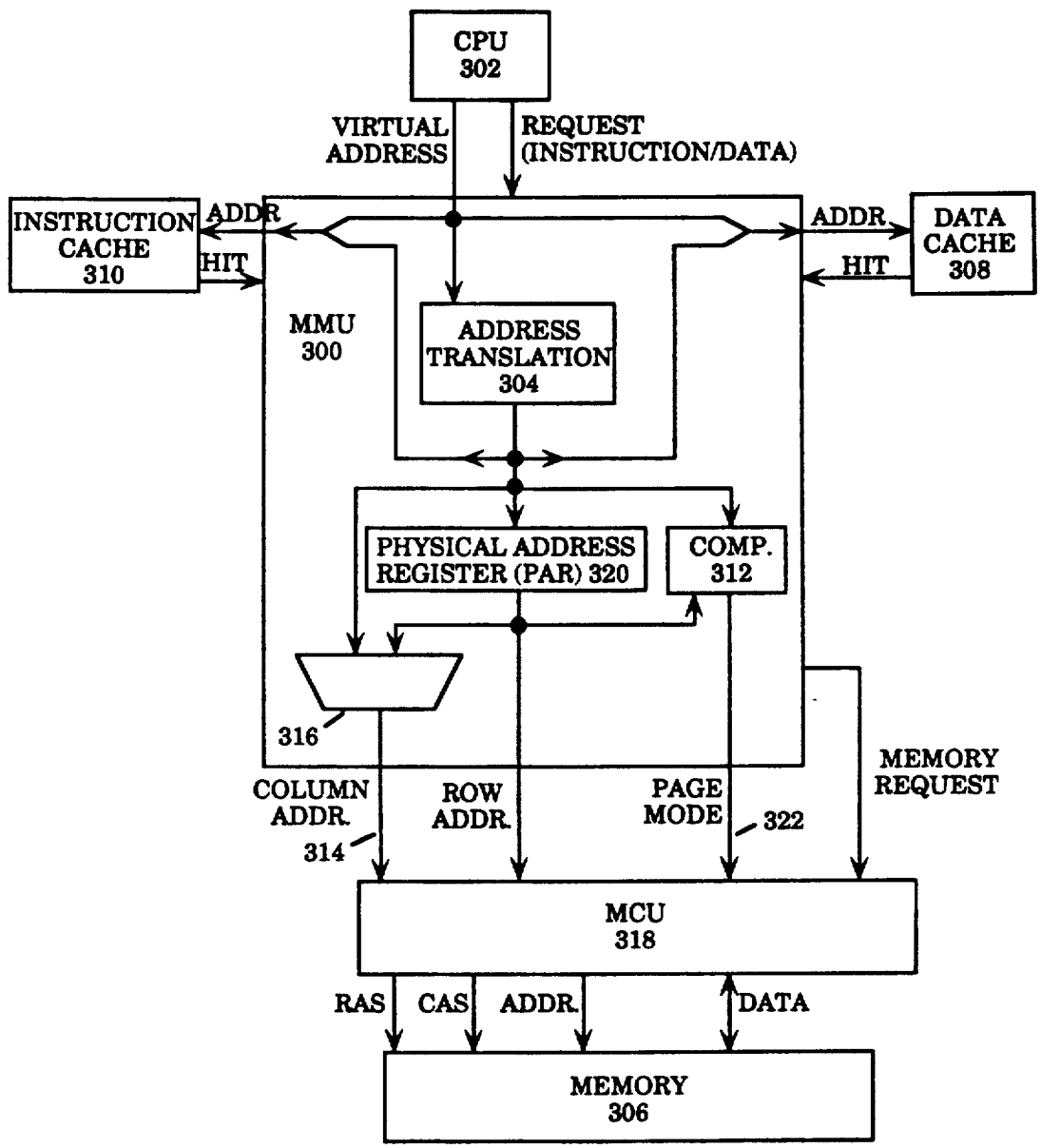
FIG. 4 is a block diagram representation of the preferred embodiment of the memory sub-system of the present invention.

FIG. 4 illustrates the memory sub-system of the present invention. Although the preferred embodiment illustrates a multiple cache system, it should be understood that the present invention is not limited as such and is applicable to a variety of system configurations including a system having a single cache. The memory management unit 300 receives the data request from the CPU 302, performs any address translation from virtual to physical that is needed in the Address Translation Block 304, determines whether the data is located in main memory 306 or in the data or instruction cache 308, 310. While determining whether the data is located in one of the caches 308, 310, and using a row address comparator 312 located in the MMU 300, the MMU also determines whether the fast page mode may be used to access data in main memory by comparing the row address of the data to be accessed with the row address of the data previously accessed. The tests to be performed to determine whether the data is located in the cache and whether a fast page mode access can be performed in a main memory access can be executed concurrently thereby saving the time needed to perform the tests in a serial manner.

A separate column address bus 314 and multiplexor 316 are provided in order that the MCU 318 has quick access to the column address. Typically when an address is translated it is stored in the Physical Address Register (PAR) 320. To save on the clock cycles needed to store the addresses in the PAR 320 and subsequently read out from PAR 320, a bypass data path is provided by the multiplexor 316 and column address bus 314. When the column address is output by Address Translation block 304 to the PAR 320, the column address is also directed to the multiplexor 316 which forwards the column address onto the column address bus 314 to the MCU 318. When the PAR is not being loaded during a particular clock cycle, the multiplexor 316 causes the column address output from the PAR 320 to be placed on the column address bus 314 for input to the MCU 318. Thus, the bypass data path provides the column address to MCU one clock cycle sooner.

A state machine (not shown) is utilized to control accesses to cache and memory. If a cache miss occurs, the state machine indicates that a memory access is to be performed. The state machine also allows, via multiple cache system, subsequent address translations as well as I/O translations to be performed while waiting for the data to be returned from a main memory read request. The sate machine further controls the next main memory access to be performed. In order to accommodate fast page mode accessing of the present invention the state machine recognizes which addresses access data in a cache and which access main memory such that the row address comparator 312 always compares the row address of the last data retrieved from main memory. The state machine maintains the address of the last main memory access for input to the row address comparator 312. Thus, if a memory access to main memory occurs followed by a number of memory accesses in which cache hits occur (therefore the data is retrieved from the cache and not main memory), the state machine will maintain the row address of the last access to main memory and cause that row address to be input to the row address comparator to determine whether a fast page mode access can be performed.

If the data is not located in the caches 308 or 310, the MMU, using row address comparator 312, already has determined whether a fast page mode access can be executed and based upon that determination, a signal is sent to the memory control unit (MCU) 318 to either retrieve the requested data from main memory 306 using either a fast page mode access or the slower random access. The MCU, through the column address bus 314, has the addressing information to perform the fast page mode access which permits it to immediately perform the fast page mode access upon receipt of the signal from the MMU (via page mode line 322). The MCU 318 no longer incurs the delay to perform the row address comparison in order to determine whether the fast page mode access can be employed; the MMU has already performed the task.

Figure 5:
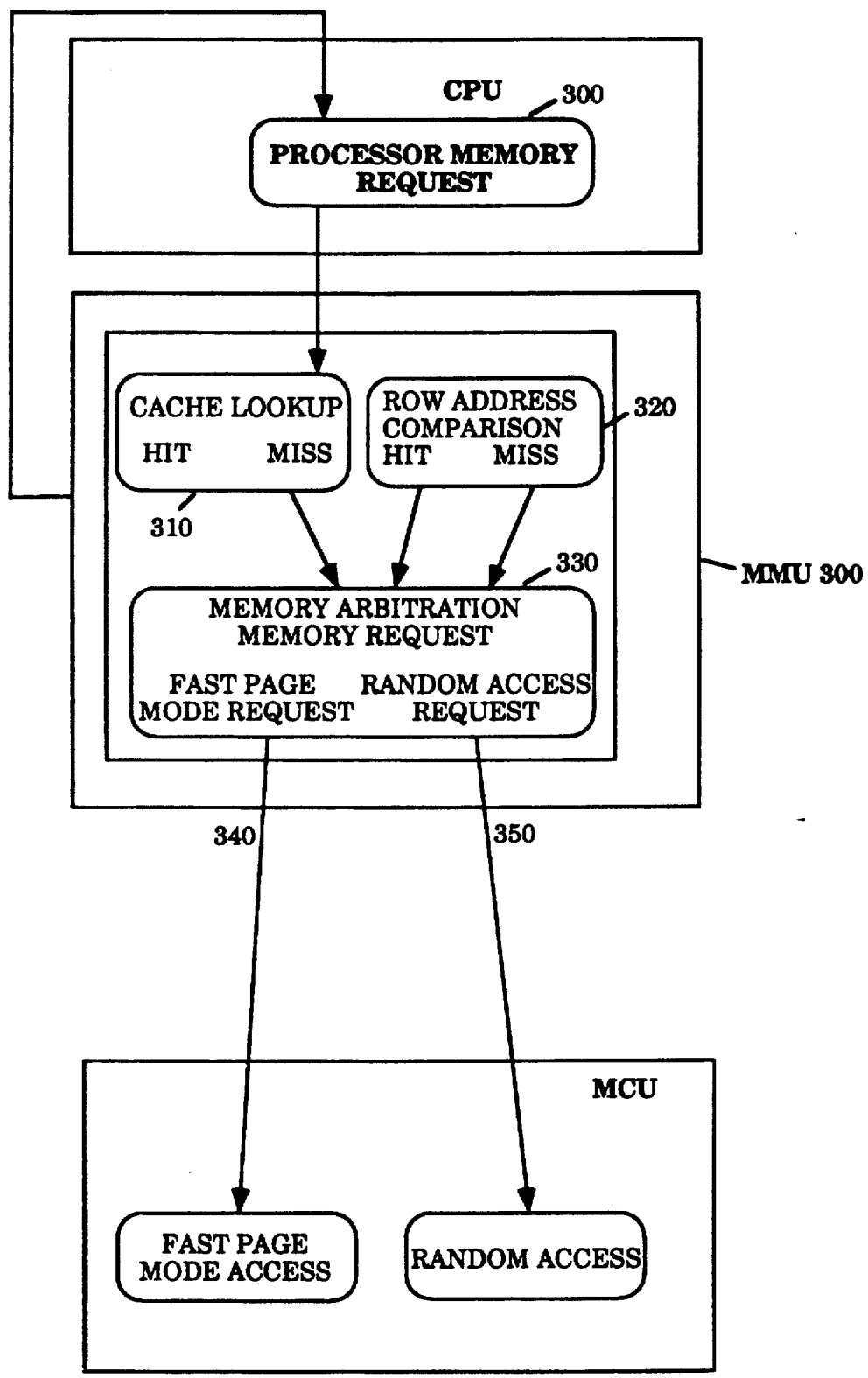
FIG. 5 is a flow diagram of the process of accessing data in a cached fast page access memory system employing the memory control unit of the present invention.

The process flow is illustrated by FIG. 5. When the CPU requests a memory operation; the MMU performs any needed virtual to physical address translation and memory arbitration as well as concurrently performing a cache lookup 310, to determine whether the data is located in the cache, and a row address comparator 312, to determine if the row address of the data to be accessed is the same row address as the data previously accessed from main memory by permitting a fast page mode access of main memory.

If the MMU determines that the data is located in the cache, the data is retrieved from the cache and returned to the CPU in response to the memory request. If the data is not in the cache, the MMU will already have determined whether a fast page mode access can be performed (from the row address comparison) and will immediately send a signal to the MCU to access the data using either the fast page mode access 340 or random access 350. Therefore, the extra time typically needed for the MCU to perform the row address comparison is saved thereby decreasing the amount of latency incurred when retrieving data from main memory in a cache based memory subsystem.

Figure 1:
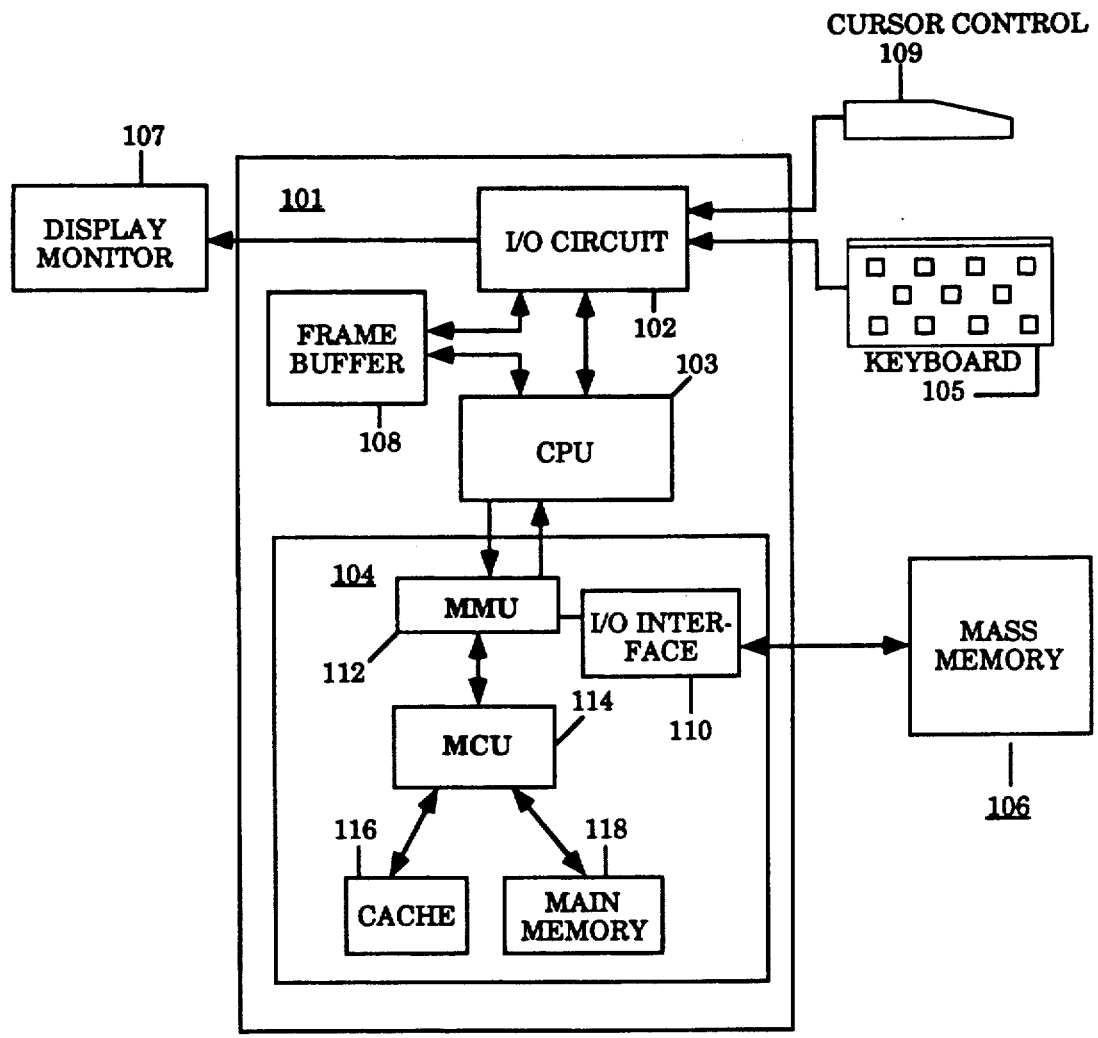
FIG. 1 is a block diagram representation of an illustrative computer system employing a cached memory sub-system.
Figure 2:
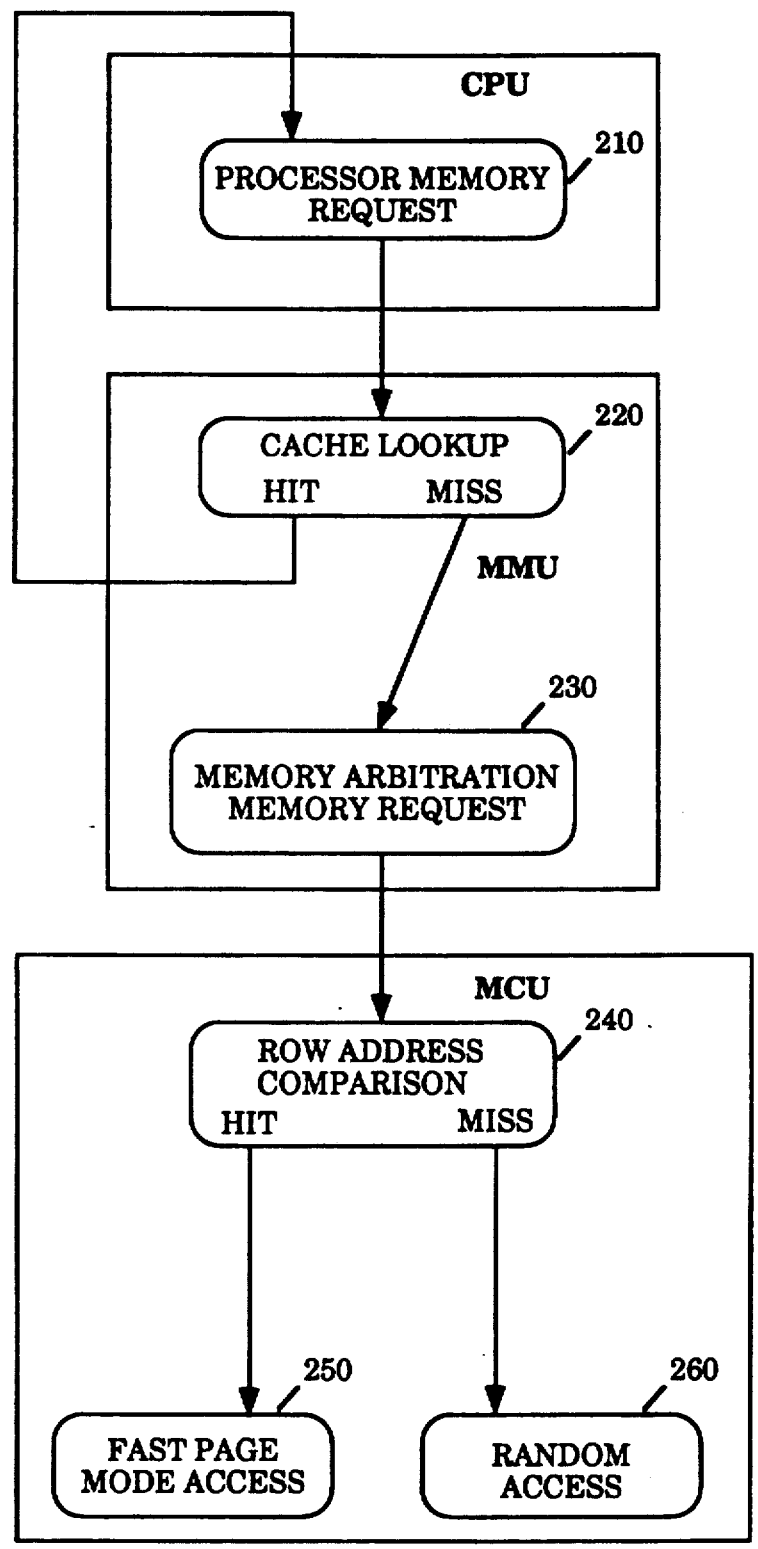
FIG. 2 is a flow diagram of the prior art technique of accessing data in a cached fast page access memory system.
Figure 3:
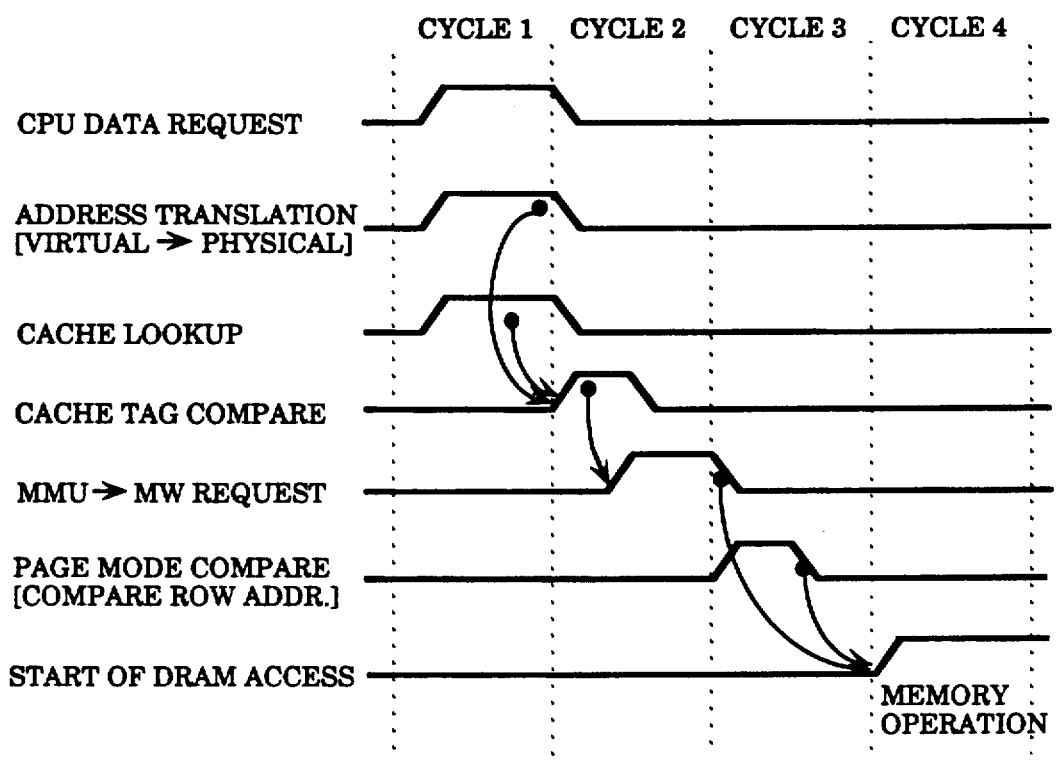
FIG. 3 is a timing diagram for the prior art technique of accessing data in a cached fast page access memory system.
Figure 6:
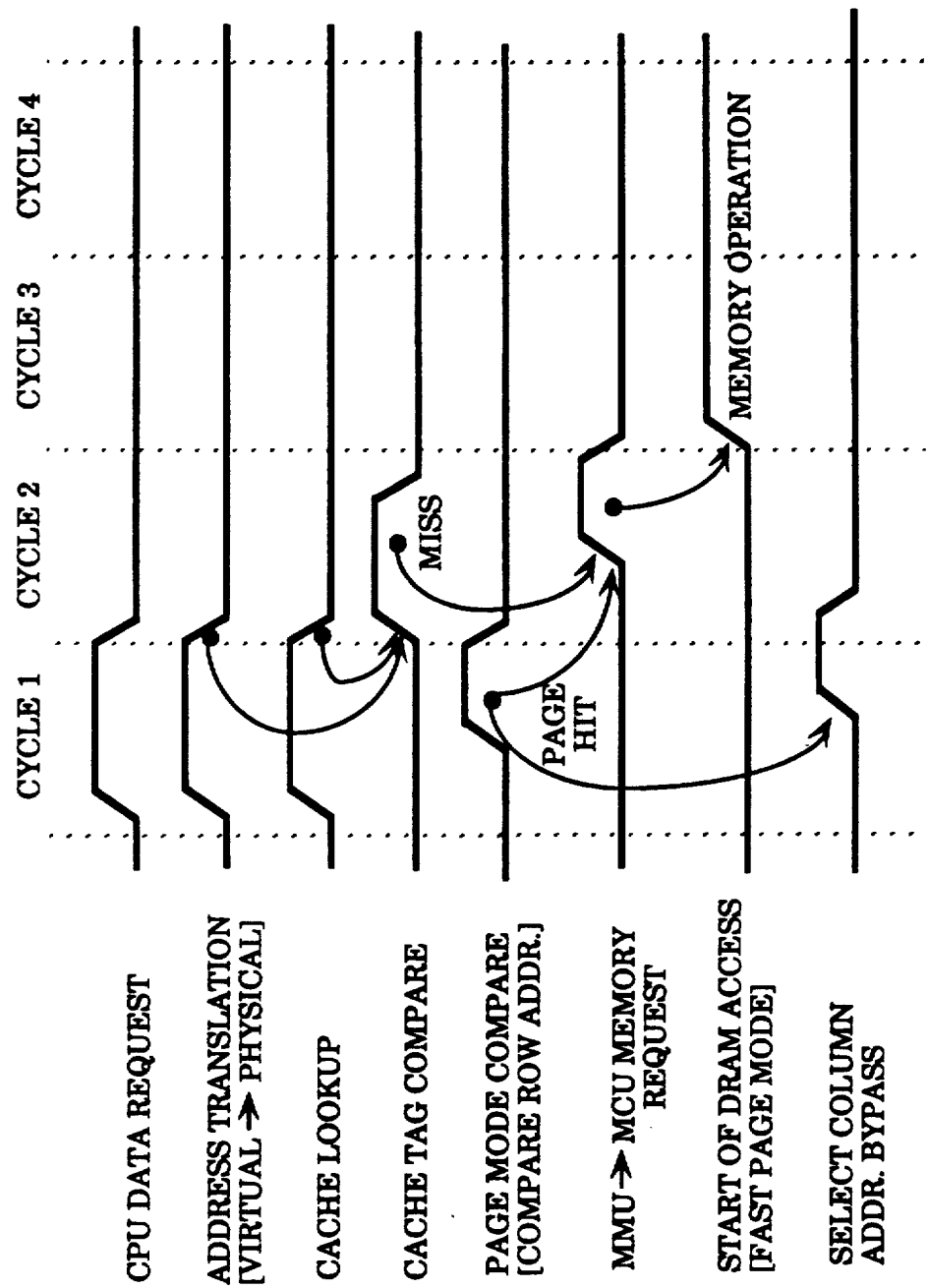
FIG. 6 is a timing diagram for the preferred embodiment of the memory sub-system of the present invention.

This is illustrated in the exemplary timing diagram of FIG. 6. A fast page mode access can be initiated at the beginning of the third clock cycle. During the first clock cycle, the address translation, cache lookup and page mode comparison occur. If the cache tag comparison determines a cache miss and the MMU→MCU memory request line goes active, the fast page mode access is initiated at the beginning of the next clock cycle. A comparison of the timing diagram of FIG. 6 with the timing diagram of FIG. 3, shows that the present invention decreases the latency by one clock cycle over prior art methods when performing a fast page mode access.

While the invention has been described in conjunction with the preferred embodiment, it is evident that numerous alternatives, modifications, variations and uses would be apparent to those skilled in the art in light of the foregoing description.

We claim:

1. A computer system comprising a central processing unit (CPU) and a memory subsystem connected to said CPU for providing CPU access to memory, said memory subsystem comprising:
   a cache memory;
   a main memory comprising at least one DRAM which provides for fast page mode access;
   a memory management unit (MMU) which receives a memory request, said memory request including a virtual address, said MMU comprising;
      address translation means to translate the virtual memory address into a physical address comprising a row address and a column address, said physical address output to a physical address register; column address bypass means for directly outputting the column address, thereby bypassing the physical address register, such that the column address is output one clock cycle earlier than if the column address is output through the physical address register;
      cache determining means for determining if a data value at the virtual address specified in said memory request to be accessed is currently located in the cache memory;
      fast page mode access determining means for determining if the row address of the data to be accessed is the same as a row address of data previously accessed in said main memory, said fast page mode access determining means executes concurrently with said cache determining means;
      if the cache determining means determines that the data to be accessed is currently located in the cache, output means coupled to said cache output an instruction to access the cache;
      if the cache determining means determines that the data to be accessed is not located in the cache, said output means outputting an instruction to access data in main memory using
         the fast page mode access if the fast page mode access determining means determines the row address of the data to be accessed is the same as the row address of data previously accessed in main memory, else
         random access if the fast page mode access determining means determines that the row address of the data to be accessed is not the same as the row address of data previously accessed in main memory;
   a memory control unit (MCU) coupled to the MMU and said main memory, to receive instructions output by the MMU, and to the cache and main memory to drive signals across control lines connected to the cache and main memory to access the memory address locations requested by the CPU according to instructions provided to the MCU by the MMU, such that the MCU receives the instruction to access data in main memory using random access, and
   retrieves data from memory according to the instruction received; such that memory access time is decreased for accesses to main memory by concurrently determining whether memory can be accessed through the cache or through the main memory using fast page mode access.

2. The computer system as set forth in claim 1, wherein said column address bypass means comprises a column address bus and a multiplexor, the output of the address translation means and the physical address register being coupled to the inputs of the multiplexor and the column address bus being coupled to the output of the multiplexor, such that if a column address is output from the address translation means, the multiplexor outputs the column address on to the column address bus, and if a column address is not output from the address translation means, the multiplexor outputs a column address from the physical address register.

3. The computer system as set forth in claim 1, said memory subsystem further comprising a row determining means for determining the last row accessed in main memory, said row determining means being coupled to the fast page mode access determining means to provide the row address of data previously accessed in main memory.

4. The computer system as set forth in claim 3, wherein said row determining means comprises a state machine.

5. The computer systems as set forth in claim 1, wherein said cache memory comprises an instruction cache and data cache.

6. The computer system as set forth in claim 1, wherein said cache memory comprises multiple caches.

7. In a computer system comprising a central processing unit (CPU) and a memory subsystem connected to said CPU for providing CPU access to memory, said memory subsystem comprising a cache memory, a main memory comprising at least one DRAM which provides for fast page mode access, a memory management unit (MMU) which receives a memory request from the CPU for access to memory, and a memory control unit (MCU), connected to the MMU and the cache and main memory, to drive address/control lines on cache and main memory to access data, a process for accessing memory comprising the steps of:
   said CPU providing a memory request to said MMU, said memory request requesting data at a virtual address, said MMU translating said virtual address to a physical address comprising a row address and a column address;
   determining if the requested data to be accessed is currently located in the cache memory while concurrently determining if the row address of the data to be accessed is the same as the row address of data previously accessed in main memory;
   if the data to be accessed is currently located in the cache, accessing the data located in the cache;
   if the data to be accessed is not located in the cache, and if the row address of the data to be accessed is the same as the row address of data previously accessed in main memory, accessing the data in main memory using the fast page mode access;

if the data to be accessed is not located in the cache, and if the row address of the data to be accessed is not the same as the row address of data previously accessed in main memory, accessing the data in main memory using, random access;

such that memory access time is decreased for accesses to main memory by concurrently determining whether memory can be accessed through the cache or through the main memory using fast page mode access.

* * * * *